US012445696B2

(12) United States Patent
Downes et al.

(10) Patent No.: US 12,445,696 B2
(45) Date of Patent: Oct. 14, 2025

(54) PSYCHO-VISUAL-MODEL BASED VIDEO WATERMARK GAIN ADAPTATION

(71) Applicant: Verance Corporation, San Diego, CA (US)

(72) Inventors: Patrick George Downes, San Diego, CA (US); Rade Petrovic, San Diego, CA (US); Jian Zhao, San Diego, CA (US)

( * ) Notice: Subject to any disclaimer, the term of this patent is extended or adjusted under 35 U.S.C. 154(b) by 182 days.

(21) Appl. No.: 18/246,331

(22) PCT Filed: Sep. 23, 2021

(86) PCT No.: PCT/US2021/051843
§ 371 (c)(1),
(2) Date: Mar. 22, 2023

(87) PCT Pub. No.: WO2022/066974
PCT Pub. Date: Mar. 31, 2022

(65) Prior Publication Data
US 2023/0396859 A1 Dec. 7, 2023

Related U.S. Application Data

(60) Provisional application No. 63/081,917, filed on Sep. 23, 2020.

(51) Int. Cl.
*H04N 21/8358* (2011.01)
*G06T 1/00* (2006.01)
*G06V 10/60* (2022.01)

(52) U.S. Cl.
CPC ....... *H04N 21/8358* (2013.01); *G06T 1/0028* (2013.01); *G06T 1/005* (2013.01); *G06V 10/60* (2022.01)

(58) Field of Classification Search
CPC ........ G06V 10/60; G06T 1/0028; G06T 1/005
See application file for complete search history.

(56) References Cited

U.S. PATENT DOCUMENTS

| 2016/0277793 A1* | 9/2016 | Eyer ...................... H04H 60/73 |
| 2019/0261012 A1* | 8/2019 | Hoarty .................. G06T 1/0028 |
| 2022/0036495 A1* | 2/2022 | Reed ..................... G06T 1/0028 |

* cited by examiner

Primary Examiner — Girumsew Wendmagegn
(74) Attorney, Agent, or Firm — Donald L. Wenskay

(57) ABSTRACT

A method for embedding video watermarks. Areas of poor visual quality in a video content having embedded watermarks ar determined. The watermark symbols replace pixels in the video content with pixels in which the luma values are modulated such the luma value for a 0 bit renders as black and the luma value for a 1 bit renders a shade of gray. The luma value for the 1 bit level is reduced in those areas determined to have poor visual quality. Areas of poor visual quality may be determined by analyzing the luma values of pixels of the video content immediately adjacent to and below a particular watermark symbol to derive an adjacent brightness parameter that represents the perceptual brightness of the surrounding video content. The reduction of the luma value may be achieved by setting the 1 bit luma for a particular watermark symbol to be perceptually less bright than the adjacent brightness parameter.

19 Claims, 2 Drawing Sheets

PSYCHO-VISUAL-MODEL BASED VIDEO WATERMARK GAIN ADAPTATION

CROSS REFERENCE TO RELATED APPLICATION

This application claims the benefit of priority of U.S. Provisional Patent Application No. 63/081,917 filed on Sep. 23, 2020, the entire contents of which are incorporated by reference as part of the disclosure of this document.

FIELD OF INVENTION

The present disclosure generally relates to watermarking digital content and more particularly to enhancements to video watermarking systems.

BACKGROUND

This section is intended to provide a background or context to the disclosed embodiments that are recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video watermarking system which embeds ancillary information into a video signal is found in the ATSC standard A/335. This system replaces the luma of the top two lines of pixels with a value which is modulated by the ancillary data. Binary data is represented by two different luma values, where the luma value for a '0' bit ("Bit0") renders as black and the luma for a '1' bit ("Bit1") renders as a shade of gray.

SUMMARY OF THE INVENTION

Figure 1:
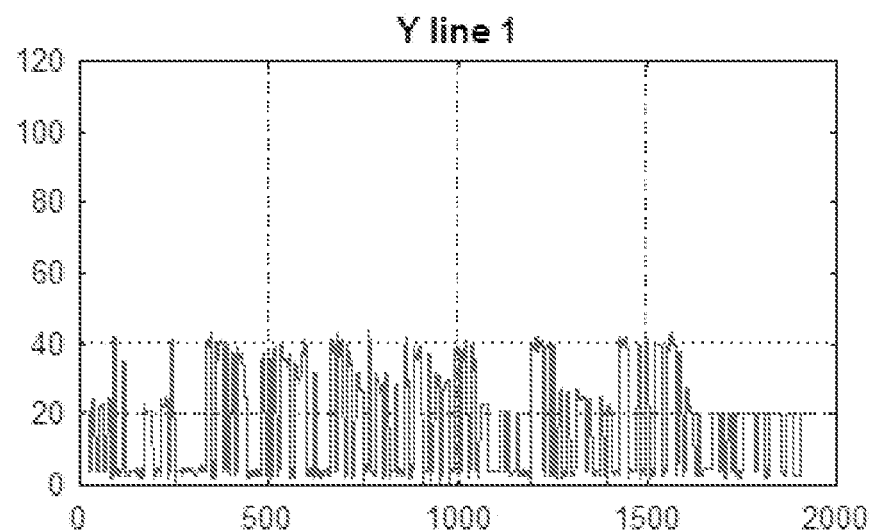
FIG. 1 illustrates an embodiment of the disclosure where percentDimmer=0.25.
Figure 1:
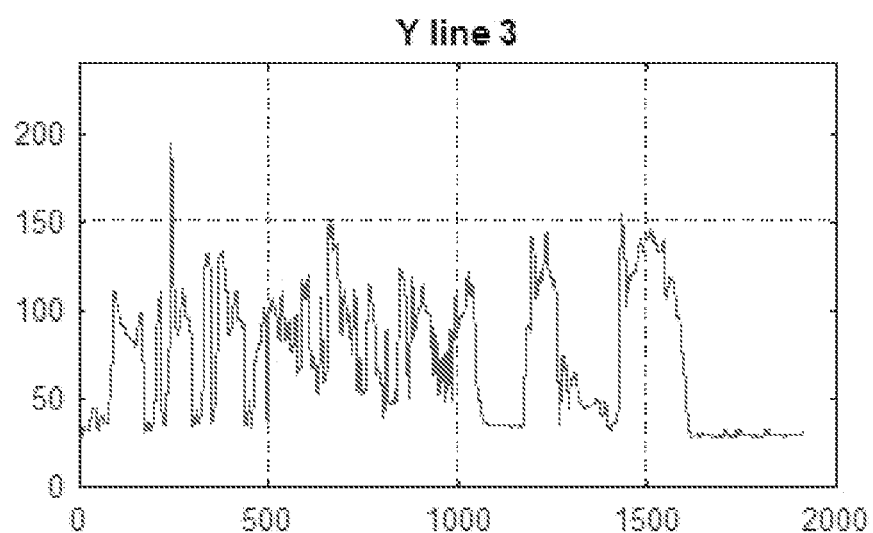
Figure 1:

This section is intended to provide a summary of certain exemplary embodiments and is not intended to limit the scope of the embodiments that are disclosed in this application.

Disclosed embodiments relate to a method of psycho-visual-model based video watermark gain adaptation. In one embodiment, a method of embedding watermarks comprises determining areas of poor visual quality in a video content having an embedded watermark including watermark symbols ("watermark segment"), wherein the watermark symbols replace pixels in the video content with pixels in which the luma values are modulated such that the luma value for a 0 bit ("Bit0") renders as black and the luma value for a 1 bit ("Bit1") renders as a shade of gray; and reducing the Bit1 luma level in those areas determined to have poor visual quality.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present disclosure may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

BACKGROUND

An example of a video watermarking system which embeds ancillary information into a video signal is found in the ATSC standard A/335 (https://muygs2x2vhb2pik6g160fls8-wpengine.netdna-ssl.com/wp-content/uploads/2021/02/A335-2016-Video-Watermark-Emission-w-Amend-1-and-2.pdf), which is incorporated by reference. This system replaces the luma of the top two lines of pixels with a value which is modulated by the ancillary data. Binary data is represented by two different luma values, where the luma value for a '0' bit ("Bit0") renders as black and the luma for a '1' bit ("Bit1") renders as a shade of gray. There is often a tradeoff of robustness and visual quality (VQ) when using fixed strength embedding systems: The higher the Bit1 luma value (e.g., 80 for an 8 bit signal), the easier the signal is to detect, but it is also more visible which can be annoying and distracting to the user.

A/335 describes a system called 1X system where the Bit1 luma value is chosen by the broadcaster to set the desired balance between visibility and robustness, and does not describe methods for varying the '1' bit luma value from frame to frame nor within a frame. In A/335, two encoding options are offered, one providing a watermark payload of 30 bytes per video frame (a "1X" version), and the second "2X" version offering double that capacity.

A/335 predicted that visibility would not be a concern: "Visibility of this video watermark is not anticipated to be an issue because ATSC 3.0-aware receivers are expected to be designed with the knowledge that the top two lines of active video may include this watermark, and will thus avoid displaying (by any means desired). The majority of HDTV display systems in use at the time of publication operate by default in an "overscan" mode in which only the central~95% of video lines are displayed. Thus, if watermarked video is delivered to a non-ATSC 3.0-aware receiver, the watermark would not normally be seen". However, many modem TVs will be shipped with default configuration for full frame viewing (a.k.a. "full pixel" mode) and watermark visibility becomes an important quality to minimize.

Embodiments of the disclosure comprise a Psycho-Visual-Model (PVM) based video watermark gain adaptation for Bit1 luma. These embodiments focus on recognizing areas of poor visual quality and reducing bit1 level in those areas.

One aspect of this design is driven by three observations:
1. A watermark symbol virtually disappears in bright scenes. In particular, the masking is most prominent when the adjacent luma is much brighter than the Bit1 luma level.
2. A watermark symbol is most visible in dark scenes. It stands out when adjacent host luma is less bright than Bit1 luma level.
3. The perceptual compression algorithms tend to preserve dark shades of gray much better in dark scenes than in the bright scenes or scenes with large luma. variations. Therefore, 1X watermarks specified in A/335 tend to be more robust in dark scenes than in other content.

Example Embedder

One embodiment of the disclosure analyzes the luma of the pixels of the host video immediately adjacent to and below the watermark segment and creates a derived parameter, adjacentBrightness, that represents the perceptual brightness of the surrounding host video. It then attempts to set the Bit1 value for that watermark segment to be perceptually less bright than the derived parameter. The watermark segment at minimum comprises a watermark symbol, but may comprise a predefined group of symbols, entire frame or a group of frames.

A simple embodiment for the case where the watermark segment comprises a single symbol is described below. Luma values for a frame are contained in an array Y(height, width), and adjacentBrightness is calculated by using the arithmetic mean of equally weighted values of the luma for pixels immediately adjacent and below the symbol being encoded, which would be pixels from line 3 in the A/335 system. A proposed value for Bit1 is calculated as a percentage of the difference between the derived brightness parameter and the minimum value that Bit1 can take. If that proposed value is less than the nominal Bit1 luma value ("bit1Nominal"), it is used as the Bit1 luma value for the current symbol, otherwise bit1Nominal is used. Here, bit1Nominal is chosen to achieve sufficient robustness when used with static fixed strength embedding. This example has two parameters which can be varied: percentDimmer controls the scaling of the luma reduction, and bit1Min controls the minimum luma value which could be used for Bit1.

```
percentDimmer = 0.25   //how much dimmer Bit1 will be
bit1Min = 17   // minimum luma value to be used for Bit1
bit1Nominal = 40
for each_symbol_in_frame
  adjacentBrightness = mean( Y(3, symbolStart:symbolEnd))
  proposedBitLevel = bit1Min + max((adjacentBrightness – bit1Min), 0)
    * percentDimmer
  if dataBit == 0
    embeddedLuma = Bit0
  else
    embeddedLuma = min(proposedBitLevel, bit1Nominal)
  Y(1:2, symbolStart:symbolEnd) = embeddedLuma
end
```

FIG. 1 shows an application of this algorithm.

Note that adjacentBrightness might be black with luma values <=16, and in this case Bit1 could be <=Bit0 making detection of that symbol impossible, but which yields the best visual quality. An alternate calculation improves robustness with only a minor impact on visual quality: a minimum spread between Bit0 and Bit1, minSpreadBit0, is used to ensure a minimum separation between Bit0 and Bit1:

clippedDifference=max((adjacentBrightness−bit1 Min),0)*percentDimmer proposedBitLevel=bit1 Min+max(clippedDifference, minSpreadBit0)

The example above uses a multiplicative relationship between proposedBitLevel and adjacentBrightness. Alternatively, one could use an additive relationship to maintain a minimum additive distance between the two values:

proposedBitLevel=max(adjacentBrightness−minAdditiveDifference,bit1 Min)

The two examples above illustrate linear relationships between proposedBitLevel and adjacentBrightness, but in general other non-linear mappings could be used.

Segmented Embedding adjacentBrightness is calculated here as an average of immediately adjacent luma values, however other algorithms can be used. For example, it could be calculated using a weighted sum of luma values that extend beyond the symbol boundary and beyond the third line, and it could include information from adjacent frames. In some embodiments, coordinated segmented embedding and detection may be employed. In particular, adjacentBrightness could be calculated using fixed segment boundaries that span several symbols, entire frame or multiple frames, so that all Bit1s embedded within that span would have the same luma value. A detector could use these same segment boundaries to optimize the detection threshold for each segment.

A disadvantage of using fixed segment sizes for calculating adjacentBrightness is that the luma of the host content might change rapidly within a segment so that Bit1 luma value is sub-optimal for some symbols resulting in either decreased robustness or poor VQ. This disadvantage can be overcome if the segment size is dynamically chosen to include only symbols where the variance of luma is below a threshold. One way to do this is to calculate the running variance of the luma of the adjacent host content and create a segment boundary whenever the running variance exceeds a threshold. When the variance is above the threshold, a fixed segment size can be used. A detector can perform the same calculations to find the same segment boundaries and optimize the detection threshold for each segment.

In an alternate embodiment the adjacentBrightness can be selected for entire watermarking segment based on the darkest adjacentBrightness of individual symbols within the watermarking segment. In yet another alternate embodiment the adjacentBrightness can be selected for entire watermarking segment based on the n darkest adjacentBrightness of individual symbols within the watermarking segment, where n is less than total number of symbols per segment.

Dynamic Parameter Tuning

The tuning parameters in the above examples, including percentDimmer, bit1Min, bit1Nominal, minSpreadBit0, minAdditiveDifference could be set to fixed values, or could be varied symbol by symbol, or frame by frame.

An example of dynamic setting of parameters is to ensure detectability for certain frames which have been identified as important. For example, the starting frame of an ad pod where a replacement ad insertion might occur could be marked as important, and the embedder could tune the parameters for optimal detectability at the expense of visual quality for that frame. Alternatively, when embedder is tasked to embed a message that doesn't include Forward Error Correction (FEC), the embedder may choose to boost robustness, while for frames that carry messages with FEC the embedder may choose to emphasize VQ.

Another example of dynamic setting of parameters uses continuous monitoring to maintain a minimum level of robustness: During embedding, the detectability of the embedded frame can be evaluated in real time by processing the embedded fames using processes similar to those found in the real broadcast path, then running a detector on those processed frames. A detection error metric can then be used to modulate some or all of the parameters to maintain robustness at a desired level.

Another example of dynamic setting of parameters is an embedder that keeps count of the number of undetectable symbols ("devilBitCount")(e.g., where adjacentBrightness is black) and keeps minSpreadBit0=0 until devilBitCount exceeds a threshold number of errors that can be corrected by the error detection/correction capability of the system.

HVS Models for Increased Robustness

The embedder described above starts with a nominal bit1 level, bit1Nominal, which is chosen to achieve sufficient robustness when used with static fixed strength embedding. An alternate implementation can start with a lower bit1Nominal value and use other Human Visual System Models (HVS) to increase gains when the watermark might be masked by the host content, and lower gains when masking is not as strong.

This can be combined with the system described above which uses adjacent brightness modulation.

(HVS) models have been widely employed to determine watermarking strengths for optimal tradeoff between watermark robustness and visual quality of watermarked content. Some of the HVS characteristics, their masking effects, and associated implications for dynamic watermark strength are given in Table 1.

Motions in temporal domain can be simply measured by luminance variances between two or more video consecutive frames. For an image area in the in same spatial location of the multiple frames, the motion measurement is the mean value of variances.

Once a feature associated with HVS characteristics is calculated, it can be used to dynamically scale base watermark strength i.e., by increasing or decreasing luma values for embedding either symbol value 0 or 1. The base watermark strength is a given as a static value for embedding a specific symbol value when no adaptive watermark strength is applied.

Assume $F_{min}$ and $F_{max}$ are the min and max values measured from pixels that are adjacent spatial and/or temporal to an image area to be watermarked using a HVS feature. Assume that $L_{min1}$ and $L_{max1}$ are the minimum and maximum luma values for embedding the symbol value 1 correspond to the min and max watermark strength, respectively. The process to determine dynamic watermark strength for embedding a symbol value 1 is described as follows.

1) Divide the range $[F_{min}, F_{max}]$ into a number of equal or unequal subranges.
2) Assign a coefficient expressed in floating point number to each subrange and such coefficients are derived from empirical evaluation, corresponding to the relationship between the HVS feature measurement and the watermark strength.

TABLE 1

| | HVS characteristics | Masking effects | Implications to dynamic watermark strength |
|---|---|---|---|
| | HVS masking effects | | |
| 2 | Frequency masking | Higher frequency signals are less perceptual in HVS than lower frequency signals. Note: frequency in image/video means the rate of change of intensity per pixel, and it is a localization property. | Higher watermark strength can be applied to image area with higher frequency signals and vice versa. |
| 3 | Entropy masking | Entropy masking relates to weakness of human neurons in simultaneously processing complex phenomena: as the number of image details increases, the HVS decreases its sensitivity to the image details. For more information, see [Watson, A. B., Borthwick, R., and Taylor, M., 1997. Image quality and entropy masking. In Proc. SPIE Conf., vol. 3016] | Higher watermark strength can be applied to image area with higher entropy (corresponding to higher activities and less uniform in the area) and vice versa. |
| 4 | Motion masking | it is well known that the HVS cannot sense all changes in an image/video due to its underlying physiological and psychological mechanisms. As a result, HVS decreases its sensitivity to regions in a video where high motion complexity is present. | Higher watermark strength can be applied to image area with higher motions in temporal domain and vice versa. |

The image and video features associated with the HVS characteristics in Table 1 can be measured using various methods. For example:

Entropy of an image area can be calculated for a random variable X with k in K discrete states as follows: H(X)=−sum(each k in K p(k)*log(p(k))) as described in [https://en.wikipedia.org/wiki/Entropy_(information_theory)].

The frequency of an image area can be measured using the DC values in frequency bands after performing Cosine transform (DCT) of the area. Larger DC values in an image area corresponds higher frequency in the area.

3) Calculate a feature value from pixels that adjacent spatially and/or temporally to an image area to be watermarked.
4) Determine the subrange into which the feature value fall.
5) Multiple the coefficient associated with the subrange by the base watermark strength, and the result plus the base strength is the dynamic watermark strength for the image area to be watermarked.

Repeat the step 4)-6) to determine a dynamic watermark strength for one or more symbols carrying a watermark payload.

The process described above can also be applied to determine dynamic strength for embedding other symbol values than symbol value 1.

An example using entropy feature to determine dynamic watermark strength for each of watermark symbols is described as follows.

Assume that the watermark area for a symbol is 2×8 pixels on the top 2 lines of a video frame and the adjacent pixels used in entropy measurement are the 2×8 pixels immediately below the watermark area. Furthermore, assume that the base watermark strength for embedding symbol value 1 is luma 40.

1) The min and max entropy values for any 2×8 pixels is 0.0 and 5.0, respectively. Note that min entropy is corresponds to an image area with the same luma value while the max entropy value corresponds to an image area with random luma values between 0-255 for 8-bit luma image.
2) The entropy range [0.0, 5.0] is divided into 5 subranges with equal interval: [0,1], [1,2], [2,3], [3,4], and [4,5].
3) Assign the coefficients −0.5, −0.25, 0, 0.25, 0.5 to the five subranges (from the first subrange to the last one).
4) If the entropy value calculated from adjacent pixels of an image area to be watermarked is 3.5, then this value falls in the $4^{th}$ subrange and the adaptive watermark strength for this area is 0.25*40+40=50 where 40 is the base watermark strength and 0.25 is the coefficient associated with the $4^{th}$ subrange. So on for other entropy values that fall in other subranges (e.g., if the entropy value is 0.5, then it falls in the first subrange and the strength is −0.5*40+40=20).

Another example of dynamic watermark strength based on motion measurement is provided as follows. The motion is measured by calculating a mean value of luminance variance between the current video frame and one or more previous video frames. The 2×8 pixels adjacent to a watermark area in the current and one or more previous video frames are used in calculating the luma variance. The adjacent pixels are located immediately below watermark area in the current video frame.

1) The min and max motion measurement for is 0 and 4096, respectively, for 8-bit luma video frame.
2) The motion measurement range [0, 4096] is divided into 4 subranges with equal interval: [0,1024], [1024, 2048], [2048], [2048,3072], and [3072,4096].
3) Assign the coefficients −0.05, 0, 0.05, 0.1 to the 4 subranges (from the first to last subrange).
4) If the motion feature value is 4000, then it falls in the last subrange and the adaptive watermark strength for this area is 0.1*40+40=44 where 40 is the base watermark strength and 0.1 is the coefficient associated with the last subrange. So on for other motion values that fall in other subranges.

Measurements from more than one features associated with HVS characteristics can be combined to determine dynamic watermark strength. For example, when both entropy and motion measurements are used together, a sum or the average of coefficient values from both features can be used to determine the dynamic strength. Following the two examples described above, the sum of two coefficients is 0.25+0.1=0.35 where the 0.25 is the coefficient from entropy measurement and 0.1 is coefficient from motion measurement. Thus, the dynamic strength is 0.35*40=54. Alternatively, a weighted sum of coefficients from multiple feature measurements can be applied.

Detection Strategies

A/335 describes a detector which sets a fixed symbol detection threshold based on a histogram analysis of luma values across the entire top line of a frame. A different detection strategy is needed for optimum robustness when each Bit1 symbol might have a different value based on the PVM processing described above. Two general techniques are described below.

Segmented Detection

One detection strategy calculates symbol detection threshold across shorter segments of the top line. Segment size could be fixed, or it could be dynamic based on variance seen in the luma signal. In an example implementation, for each symbol the luma values are accumulated using a weighting sum of the luma values where avgOffset pixels from the start of the symbol and from the end of the symbol are not used in the calculation and given weight 0, and the remaining pixels are given weight=1.

```
pixStart = 1;
for i=1:symbolsCnt
    cumL(i) = sum(L( pixStart + avgOffset : pixStart + pixelsPerSymbol − avgOffset − 1));
    pixStart = pixStart + pixelsPerSymbol;
end
```

A second step averages these cumulative values over a section of the line to create a section threshold which is used for symbol detection. Several different values of sectionCount, the number of sections per line, can be tried to see which gives the best detection result for that line. Similarly, avgOffset can be varied to search for best detection result.

```
for si = 1:sectionCount
    startSym = (si−1) * symsPerSect + 1;
    endSym = startSym + symsPerSect − 1;
    sectThresh = mean(cumL(startSym:endSym));
    for sym = startSym:endSym
        pixStart = (sym−1) * pixelsPerSymbol + 1;
        pixEnd = pixStart + pixelsPerSymbol −1;
        if cumL(sym) >= sectThresh
            syms(sym) = 1;
        else
            syms(sym) = 0;
        end
    end
end
```

An improved design can synchronize the sectionCount with an embedder which uses segmented embedding to keep Bit1 luma values constant across a segment.

A disadvantage of using fixed segment sizes is that the luma of the host content might change rapidly across a segment so that Bit1 luma value is sub-optimal for some symbols resulting in either decreased robustness or poor VQ. This disadvantage can be overcome if the segment size is dynamically chosen to include only symbols where the variance of luma is below a threshold. One way to do this is to calculate the running variance of the luma of the adjacent host content and create a segment boundary whenever the running variance exceeds a threshold. When the variance is above the threshold, a fixed segment size can be used. An embedder can perform the same calculations to find the same segment boundaries, and this synchronization between embedder and detector can result in an optimized detection threshold for each segment.

Dynamic Detection

A different approach to detection looks at the luma signal before and after a symbol boundary to determine whether there was a transition from Bit0 to Bit1, a transition from Bit1 to Bit0, or no transition; this allows individual symbol detection of embedded content where each symbol might have a different Bit1 value.

```
prevAvg = knownFirstBit1Value
    prevSymbol = knownFirstSymbolValue
for symbolIndex=1:symbolsCnt
    avgLuma = calculateWeightedAverageLuma(symbolIndex);
    velocity = avgLuma - prevAvg;
    if velocity > decisionThresh
        symbol = 1;
    elseif velocity < -decisionThresh
        symbol = 0;
    else
        symbol = prevSymbol;
    end
    prevAvg = avgLuma;
    prevSymbol = symbol;
end
```

Sometimes symbol transitions can be distorted by perceptual codecs. Transition detection can be combined with detection thresholds estimated using a segmentation approach to further improve symbol detection.

A Filtering Appliance

The embedding techniques described here can be used in an embedder which operates on unembedded content. They can also be used in a processing device which operates on previously embedded content to improve robustness and/or visual quality of the watermark. A built-in detector would be used to detect the existing watermarks, which would be re-embedded using the techniques described above.

Figure 2:
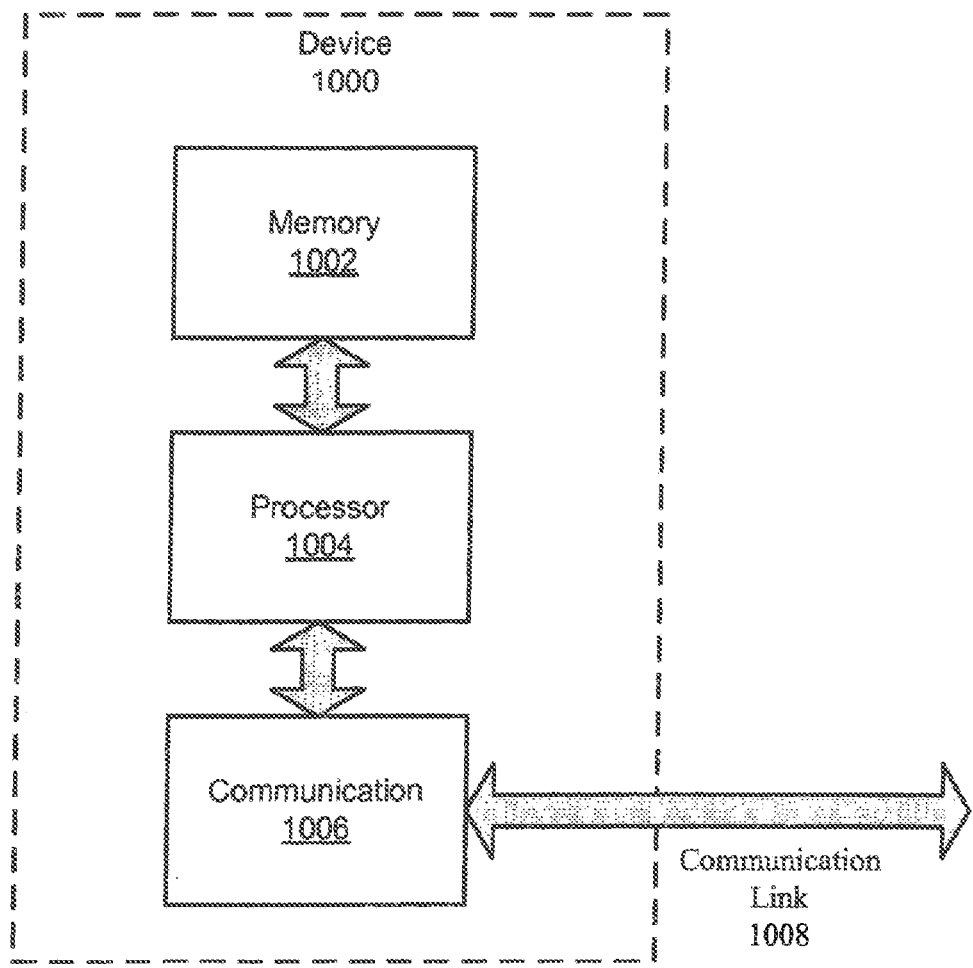
FIG. 2 illustrates a block diagram of a device that can be used for implementing various disclosed embodiments.

It is understood that the various embodiments of the present disclosure may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 2 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 2 the device 1000 and the like may be implemented in software, hardware, firmware, or combinations thereof. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present disclosure in various embodiments and with various modifications as are suited to the particular use contemplated. The features of the embodiments described herein may be combined in all possible combinations of methods, apparatus, modules, systems, and computer program products.

What is claimed is:

1. A method comprising:
    determining areas of poor visual quality in a video content that may be the result of watermark embedding by analyzing the luma values of pixels of the video content immediately below a particular watermark symbol to derive a brightness parameter that represents the perceptual brightness of the surrounding video content;
    determining watermark robustness requirements;
    embedding the video content with a watermark including watermark symbols, wherein the watermark symbols replace pixels in the video content with pixels in which luma values are modulated such that the luma value for a 0 bit ("Bit0") renders as black and the luma value for a 1 bit ("Bit1") renders as a shade of gray; and
    adjusting the 1 bit luma level based on visual quality and said watermark robustness requirements.

2. The method of claim 1 wherein reducing the Bit1 level comprises:
    setting the Bit1 luma for a particular watermark symbol to be perceptually less bright than the brightness parameter.

3. The method of claim 2 further comprising setting Bit1 luma as a percentage of the difference between the derived parameter and the minimum value that Bit1 can take.

4. The method of claim 1 further comprising detecting the watermark by calculating a symbol detection threshold across a segment of a top line of the video.

5. The method of claim 4 further comprising changing the size of the segment based on variations in the luma signal.

6. The method of claim 1 further comprising detecting the watermark by:
analyzing the luma signal before and after a symbol boundary to determine whether there was a transition from Bit1 to Bit1, a transition from Bit1 to Bit0, or no transition, thereby enabling individual symbol detection of embedded content where each symbol might have a different Bit1 value.

7. The method of claim 1 further comprising calculating a value for adjacentBrightness using fixed segment boundaries that span several symbols, entire frame, or multiple frames, such that all Bit1s embedded within that span have the same luma value.

8. The method of claim 7 further comprising detecting the watermark using the same fixed segment boundaries to optimize the detection threshold for each segment.

9. The method of claim 1 further comprising calculating a value for adjacentBrightness using variable size segment boundaries, wherein the segment size is chosen to include only symbols where the variance of luma is below a threshold.

10. The method of claim 9 wherein the calculating further comprises calculating the running variance of the luma of an adjacent host content and creating a segment boundary when the running variance exceeds a threshold, wherein a fixed segment size is used if the variance is above the threshold.

11. The method of claim 10 further comprising detecting the watermark by calculating the running variance of the luma of an adjacent host content and locating segment boundaries wherein a detection threshold is optimized for each segment.

12. The method of claim 1 further comprising:
determining tuning parameters, including percentDimmer, bit1Min, bit1Nominal, minSpreadBit0, and minAdditiveDifference.

13. The method of claim 12, further comprising setting the tuning parameters to fixed values.

14. The method of claim 12 further comprising varying the tuning parameters symbol by symbol.

15. The method of claim 12 further comprising varying the tuning parameters frame by frame.

16. The method of claim 15 further comprising improving detectability a high priority frame by selecting the tuning parameters for the high priority frame for optimal detectability at the expense of visual quality for that frame.

17. The method of claim 12 further comprising:
evaluating in real time the detectability of the embedded frame during watermark embedding by processing the embedded frames and running a detector on those processed frames;
calculating a detection error metric based on the detection; and
modulating at least one of the tuning parameters so as to maintain watermark robustness at a desired level.

18. The method of claim 1 further comprising prior to determining areas of poor visual quality in a video content, detecting the presence of existing watermarks.

19. The method of claim 1 wherein watermark robustness requirements are determined based on at least one of the one of the following considerations:
a. whether the symbol belongs to an important message;
b. whether the message includes FEC;
c. whether embedded symbols are found experimentally to lack robustness;
d. the video entropy of the area;
e. a measurement of video motion;
f. expected processing in a content broadcast path; and
g. expected perceptual compression algorithms.

* * * * *